(12) United States Patent
Cox et al.

(10) Patent No.: US 9,555,884 B2
(45) Date of Patent: Jan. 31, 2017

(54) METHOD FOR IMPROVING GROUND TRAVEL CAPABILITY AND ENHANCING STEALTH IN UNMANNED AERIAL VEHICLES

(71) Applicant: Borealis Technical Limited, London (GB)

(72) Inventors: Joseph Cox, Portland, OR (US); Rodney T. Cox, North Plains, OR (US); Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 353 days.

(21) Appl. No.: 13/769,839

(22) Filed: Feb. 19, 2013

(65) Prior Publication Data

US 2013/0214089 A1 Aug. 22, 2013

Related U.S. Application Data

(60) Provisional application No. 61/599,584, filed on Feb. 16, 2012.

(51) Int. Cl.
*B64C 39/02* (2006.01)
*B64C 25/40* (2006.01)

(52) U.S. Cl.
CPC ........... *B64C 39/024* (2013.01); *B64C 25/405* (2013.01); *B64C 2201/141* (2013.01);
(Continued)

(58) Field of Classification Search
CPC .. B64C 25/405; B64C 39/024; B64C 2201/22; B64C 2201/121; B64C 2201/123; B64C 2201/126; B64C 2201/141; B64C 2201/143
See application file for complete search history.

(56) References Cited

U.S. PATENT DOCUMENTS 5,860,620 A 1/1999 Wainfan et al.
6,657,334 B1 * 12/2003 Edelson ...................... 310/68 R
(Continued)

OTHER PUBLICATIONS

"Barra Airport (Scotland)", Printed May 5, 2016, Wikipedia, All Pages.*
(Continued)

*Primary Examiner* — Nicholas McFall

(57) ABSTRACT

A method for improving ground movement capability and enhancing stealth in unmanned aerial vehicles is provided. The present method comprises providing, in an unmanned aerial vehicle equipped with wheels, one or more onboard drive means capable of translating torque through the vehicle wheels and controllable to move the unmanned aerial vehicle on the ground without reliance on the unmanned aerial vehicle main motive power source. The onboard drive means is controllably powered by a power source with substantially no acoustic signature to move the unmanned aerial vehicle quietly on the ground with only a minimal audible or visible footprint. This method provides a significant expansion of ground movement capability and expands the potential ground uses of unmanned aerial vehicles, particularly in military applications. The present method can also be applied to move any manned aerial vehicle or aircraft on the ground with only minimal audible or visible footprints.

11 Claims, 2 Drawing Sheets

(52) U.S. Cl.
CPC .... *B64C 2201/146* (2013.01); *B64C 2201/22* (2013.01); *Y02T 50/823* (2013.01)

(56) References Cited

U.S. PATENT DOCUMENTS

| | | |
|---|---|---|
| 6,838,791 B2 | 1/2005 | Edelson |
| 7,116,019 B2 | 10/2006 | Edelson |
| 7,226,018 B2 | 6/2007 | Sullivan |
| 7,445,178 B2 | 11/2008 | McCoskey et al. |
| 7,469,858 B2 | 12/2008 | Edelson |
| 7,975,960 B2 | 7/2011 | Cox |
| 8,074,918 B1* | 12/2011 | Monson et al. ............... 244/15 |
| 8,220,740 B2 | 7/2012 | Cox et al. |
| 2006/0065779 A1* | 3/2006 | McCoskey et al. ...... 244/100 R |
| 2006/0273686 A1 | 12/2006 | Edelson et al. |
| 2007/0252029 A1* | 11/2007 | Karem ........................ 244/1 R |
| 2009/0105891 A1* | 4/2009 | Jones ..................... B64C 13/18 701/2 |
| 2010/0276535 A1* | 11/2010 | Charuel et al. ............... 244/50 |
| 2011/0147515 A1* | 6/2011 | Miller et al. ................... 244/63 |

OTHER PUBLICATIONS

AirShip Technologies Group, "VTOL UAVs", www.AirShipTG.org, 2015, Lake Oswego, OR.

\* cited by examiner

METHOD FOR IMPROVING GROUND TRAVEL CAPABILITY AND ENHANCING STEALTH IN UNMANNED AERIAL VEHICLES

PRIORITY CLAIM

This application claims priority from U.S. Provisional Application No. 61/599,584, filed 16 Feb. 2012, the disclosure of which is fully incorporated herein.

TECHNICAL FIELD

The present invention relates generally to improvements in operations of unmanned aerial vehicles and particularly to a method for improving ground movement capability and enhancing stealth in an unmanned aerial vehicle.

BACKGROUND OF THE INVENTION

The use of unmanned aerial vehicles, commonly identified as UAVs, and identified by the United States Federal Aviation Administration (FAA) and international authorities as unmanned aircraft systems (UAS), has increased significantly in the last decade. A UAV is a powered aerial vehicle that does not carry a human operator, but may carry a wide range of a variety of sensing and communication devices, weapons of many kinds, cargo, and, rarely, people. There are, at present, many different available and proposed designs of UAVs. Some are programmed to fly autonomously, while others are piloted remotely. There are UAVs that are recovered for reuse and UAVs that are used for only a single operation, as well as UAVs that carry lethal or nonlethal payloads. Payloads can include everything from munitions to aerial surveillance equipment and the like. UAVs can range in size from the Micro Air Vehicles that weigh less than a pound to large aircraft that weigh more than 40,000 pounds and in cost from a few thousand U.S. dollars to tens of millions of U.S. dollars.

Although military applications account for the greatest usage of UAVs, an increasing number of civilian applications, such as, for example, conducting commercial aerial surveillance, performing geochemical, geophysical and geomagnetic surveys in connection with oil, gas, and mineral exploration and production, search and rescue missions, and remote environmental sensing, can also be conducted with the use of UAVs. A UAV may be used effectively and is increasingly preferred for both civilian and military missions or operations deemed too dangerous for humans to undertake in more conventional aerial vehicles, such as the attack and reconnaissance missions currently conducted by military UAVs. Single use UAVs, common in military applications, can also be useful for civilian applications.

Unlike a missile, a UAV is capable of controlled, sustained level flight and is powered by an engine, typically a jet engine, a reciprocating engine, or another type of propulsion system. While most UAVs are fixed wing aircraft, some employ rotors, or are hybrids with both fixed wings and rotors. The ability to take off and land vertically can increase the usefulness of a UAV. The range, altitude, speed, and endurance capabilities can vary widely for different types of UAVs, as can the degree of autonomous operation. UAVs are no longer likely to be only remotely controlled or remotely piloted, but, in addition, have sophisticated automated built-in control and/or guidance systems. Such systems are able to perform functions like speed and flight path stabilization and navigation. These control and/or guidance systems may also perform one or all of such functions as combining information from different sensors, coordinating communication in the presence of incomplete or imperfect information, determining an optimal path in accordance with objectives and/or constraints, and other required control strategies. An unmanned aerial system (UAS) that includes at least one UAV will also include one or more ground control stations, specialized data control links, and other related support equipment, such as, for example, the same control systems used in aerial and space applications.

Most unmanned aerial vehicles are provided with landing structures that may or may not include wheels capable of moving the UAV on the ground. Vertical take off and landing (VTOL) UAVs may be less likely to move on the ground between landing and take off and, therefore, are less likely to have wheels, but some VTOL UAVs do have wheels. Fixed wing UAVs, which are more likely to have wheels, presently require some kind of flat runway surface for wheeled take offs and landings. Currently neither VTOL nor fixed wing UAVs equipped with wheels are expected to move for very long distances on the ground and, as a result are capable of only very limited ground movement or ground transit. When wheeled UAVs must move on the ground, their movement is typically powered by the UAV's motive power source, which is usually some type of internal combustion engine that uses a standard aircraft or hybrid type of fuel. A conceptual VTOL type of UAV designed to conform to U.S. Air Force Special Operations Transport requirements that is capable of ground transit has been proposed by AirShip Technologies Group (www.AirShipT-G.org). This proposed UAV will use an electric motor in-wheel drive train employing lithium-ion electric battery driven motors and a drive-by-wire system that will enable the driver to maneuver the wheels during ground movement. This system, which has not been built, appears intended to move a UAV only short distances on the ground, and its ability to improve UAV ground movement has not been demonstrated. The description of this vehicle, moreover, does not suggest how the improvements in ground travel and stealth achieved by the present invention could be produced.

A ram wing ground effect vehicle capable of limited flight that includes an undercarriage with wheels and an internal combustion engine driving a generator used to power electric motors at each wheel and a ducted fan to enable ground movement is described in U.S. Pat. No. 5,860,620 to Wainfan et al. This arrangement allows the vehicle to move on the ground under battery power for short distances and gives the vehicle low acoustic and infrared (IR) signatures. Neither of the aforementioned vehicles, however, has been designed to travel in contact with a ground surface for an extended time period. Ground travel capability in these vehicles is significantly limited by available battery power, and it is not suggested either how or whether ground travel capability could or should be improved or enhanced in any way.

Moving a commercial aircraft on the ground during taxi by means other than the aircraft's main engines or turbines has been described in the art. In U.S. Pat. No. 7,445,178 to McCoskey et al and U.S. Pat. No. 7,226,018 to Sullivan, for example, systems able to move aircraft on the ground during taxi using wheel motors are described. U.S. Pat. Nos. 7,975,960 and 8,220,740 to Cox et al, owned in common with the present application, describe a nose wheel control apparatus capable of driving a taxiing aircraft independently on the ground. None of the foregoing art, however, suggests employing the devices or systems described therein in connection with an unmanned aerial vehicle to enhance the independent ground travel capability of a UAV or to enhance stealth in a UAV or any other type of aircraft.

The prior art, therefore, has not provided a method or system for improving ground travel capability in unmanned aerial vehicles or for enhancing stealth in UAVs and other aircraft.

SUMMARY OF THE INVENTION

It is a primary object of the present invention, therefore, to provide a method for substantially expanding ground travel capability in unmanned aerial vehicles and for enhancing stealth in unmanned aerial vehicles and other aircraft.

It is another object of the present invention to provide a method for improving and extending ground travel capability in an unmanned aerial vehicle equipped with wheels by providing at least one onboard drive means with a low acoustic profile capable of translating torque through the unmanned aerial vehicle wheels and controllable to move the unmanned aerial vehicle on the ground without relying on the unmanned aerial vehicle's engine or main motive power source.

It is an additional object of the present invention to provide a method for enhancing stealth in an unmanned aerial vehicle by equipping the unmanned aerial vehicle with one or more onboard drive means without an acoustic profile and controllable to quietly and independently move one or more wheels of the unmanned aerial vehicle on the ground between landing and take off.

It is a further object of the present invention to provide a method that significantly increases the usefulness of unmanned aerial vehicles in ground operations.

It is yet another object of the present invention to provide a method for producing ground movement of an unmanned aerial vehicle or an aircraft with a range of acoustic footprints as needed to perform selected tasks in specific environments.

It is yet an additional object of the present invention to enhance stealth in any aircraft by providing and equipping one or more of a nose landing gear or a main landing gear wheel with an onboard drive means capable of translating torque through the aircraft wheels and controllable to move the aircraft independently on the ground with substantially no acoustic footprint.

It is yet a further object of the present invention to provide a method for moving an unmanned aerial vehicle or an aircraft on the ground with as minimal a visible or audible footprint as attainable in a specific environment or for a specific task.

In accordance with the aforesaid objects, a method for improving ground movement capability and enhancing stealth in an unmanned aerial vehicle is provided. The present method comprises providing, in an unmanned aerial vehicle equipped with wheels, one or more onboard drive means that are capable of translating torque through the vehicle wheels and controllable to move the unmanned aerial vehicle on the ground without reliance on the unmanned aerial vehicle main motive power source. The onboard drive means is controllably powered by a power source with a minimum attainable or substantially no acoustic signature to move the unmanned aerial vehicle quietly on the ground with the minimum audible or visible footprint possible. This method provides a significant expansion of ground movement capability and expands the potential ground uses of unmanned aerial vehicles, particularly in military applications. The present method can also be applied to move any aircraft on the ground with a minimal or substantially no audible or visible footprint.

Other objects and advantages will be apparent from the following description, claims, and drawing.

DESCRIPTION OF THE INVENTION

Figure 1:
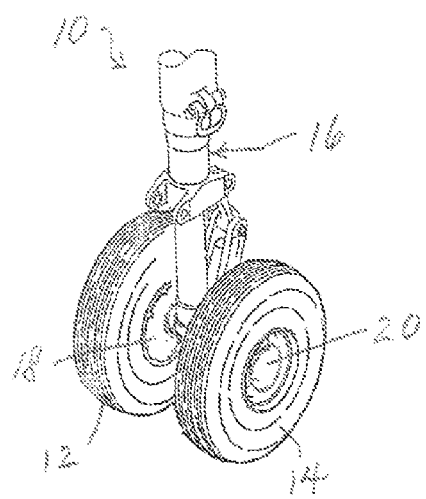
FIG. 1 is illustrates one possible arrangement of an onboard drive means associated with an unmanned aerial vehicle or aircraft drive wheel according to the present invention.

The term unmanned aerial vehicle or UAV, as discussed above, encompasses vehicles with a wide range of sizes, shapes, and other characteristics that are controlled in different ways to perform an increasingly greater number of tasks, many of which involve sensing and communicating information. Unmanned aerial vehicles may be more closely identified with their military roles in deploying munitions, however. Unmanned aerial vehicles, which use aerodynamic forces to provide vehicle lift, have been described as flying sensors. UAVs may be controlled from a remote location that could be thousands of miles away, on another continent, or even from space. This remote control may be in conjunction with an autonomous system that uses pre-programmed flight plans and complex dynamic automation systems. The maximum flight duration of a UAV varies widely from a couple of hours to 40 or more hours. The endurance of UAVs powered by internal combustion engines is generally dependent on the percentage of fuel burned as a fraction of total weight of the UAV, computed using the Breguet endurance equation. Solar-electric UAVs, which have potentially unlimited flight duration, and electric UAVs kept aloft by laser power beaming have been proposed, but these concepts are still being developed. As described below, the method of the present invention can be used to effectively increase flight duration for UAVs powered by internal combustion engines or any other propulsion systems as a result of the fuel savings produced.

In addition, the method of the present invention significantly extends both the effective ground travel range and the types of ground operations possible with a UAV in both military and civilian applications. For example, a UAV of any configuration, whether fixed wing, rotor type, hybrid or the like, that has wheels, or to which wheels can be attached, can be modified as described below. The modified UAV can be controlled, remotely or autonomously, to take off from a take off location, fly to a desired destination, land, and travel according to the present method as required on the ground to conduct a selected mission or perform a selected task, take off when the mission or task has been completed, and return to the take off location or be directed to another location to undertake an additional mission or task.

In accordance with the method of the present invention, a UAV with wheels is equipped with one or more onboard drive means with a minimal or substantially no acoustic profile or audible footprint that is capable of translating torque through the unmanned aerial vehicle wheel or wheels to move the UAV on the ground. The onboard drive means is controllable through a range of control means to move the unmanned aerial vehicle independently on the ground without reliance on the unmanned aerial vehicle engine or other motive power source with an acoustic footprint that would endanger the operation. Minimizing an acoustic profile or audible footprint permits the onboard drive means to move the unmanned aerial vehicle as quietly as possible on the ground between landing and take off.

Ground movement and/or ground travel of the unmanned aerial vehicle is produced by the operation of one or more onboard drive means drivingly associated with one or more of the UAV wheels. Operation of the drive means is powered, independently of the UAV's engines or other power sources that would generate an unacceptable acoustic footprint, to cause one or more of the UAV's wheels to rotate at a desired speed, or at a torque associated with a desired speed, thus providing the requisite power to move the UAV at the desired speed. Although as shown and discussed below in connection with FIG. 1, a preferred location for a drive means is adjacent to or within a UAV wheel, drive means locations are not limited. A drive means can be positioned at any convenient location in or on the UAV where it can be connected with one or more wheels to provide the driving power required to move the wheel or wheels at a desired speed or torque and, hence, the UAV at a desired speed on the ground. Possible locations for one or more drive means in addition to those within or adjacent to a wheel include, without limitation, on or near a wheel axle, in, on or near a landing gear bay or landing gear component, if the UAV is equipped with landing gear, or any convenient onboard location in, on, or attached to the UAV. The design and configuration of a specific UAV may dictate the choice of drive means location.

Moving a UAV or an aircraft on the ground using drive means as described herein requires providing sufficient power to the drive means to produce a torque capable of driving a wheel to move the UAV or other aircraft at a desired ground speed. While electric drive means are preferred, pneumatic, hydraulic, and other drive means that function as described herein are also contemplated for use in the present method. When an electric drive means is used in the present method, the current, and the voltage and frequency of the current, applied to the drive means can be controlled to regulate speed. In a UAV that uses an internal combustion engine to provide the motive power required for flight and is equipped with an auxiliary power unit (APU), the APU is the preferred source of electric power for powering drive means that require electric power. An APU should be set to produce an acceptable minimal acoustic footprint. In the event that a UAV does not have an APU or the APU is inoperative or otherwise unavailable for supplying electric power, a UAV main engine's generator could be used as a back-up power source. Other power sources could also be used to supplement or replace the APU as a source of power. These power sources can include, for example without limitation, batteries, fuel cells, any kind of solar power, and thermionic/thermotunneling power sources available under the name POWER CHIPS™, as well as any other power source suitable for this purpose with a minimal or no acoustic signature or audible footprint. Control of the flow of current to the drive means, as well as the voltage and frequency of the current, allows the torque generated by the drive means to be controlled and, therefore, the speed of the wheel powered by the drive means and the ground travel speed of the UAV to be controlled. A power source could be located in any convenient location where it can effectively supply power to a drive means. The aforementioned power sources all produce different acoustic signature levels, which will affect ground speed and the ground range of a UAV moving on the ground. Since minimizing the acoustic signature during ground operations is a major objective of the present method, a power source's acoustic signature must be taken into account when planning and conducting a specific ground operation.

One or more of a UAV's engines could additionally be employed as a source of bleed air for a pneumatically powered drive means. While a UAV engine does not supply power nearly as efficiently or quietly as the APU, it does provide an available alternative in an emergency. Should it be necessary to rely on a UAV engine to supply power or bleed air, the thrust levels can be set so that the engine is providing only the level of electric or pneumatic power specifically required to power the drive means to move the UAV, which also reduces the acoustic footprint and can be an important consideration when a minimal or no acoustic footprint is necessary.

One particularly preferred drive means for use in connection with the present method is an electric drive means that may be an enclosed machine capable of operating for at least several minutes at maximum torque and for over 20 minutes at cruise torque. This electric drive means may be any one of a number of designs sized to work with a specific UAV design, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, a permanent magnet brushless motor, a synchronous motor, an asynchronous motor, a pancake motor, a switched reluctance motor, electric induction motor, or any other electric motor geometry or type known in the art is also contemplated to be suitable for use in the present invention. While these drive means may have an acoustic profile or audible footprint, this is within an acceptable range for many operations, including moving a large UAV fairly quietly and efficiently on the ground.

The drive means selected, whether electric, pneumatic, hydraulic, or any other type of drive means, should be able to move a UAV wheel at desired speeds and torques. One kind of electric drive means preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move large commercial sized aircraft at an optimum speed for ground movement and will work equally effectively to move a UAV on the ground. The disclosures of the aforementioned patents are incorporated herein by reference. Other drive means designs capable of high torque operation across a desired speed range that can move a UAV wheel to function as described herein may also be suitable for use in the present invention.

Referring to the drawings, FIG. 1 illustrates one type of UAV wheel assembly 10. The wheel assembly 10 includes two wheels 12 and 14 rotatably mounted on an axle (not shown) attached to a strut 16 that is attached to a suitable location on the body of the UAV. As indicated above, one or more drive means is positioned in a location where the drive means can drive one or more of the UAV wheels 12, 14. A drive means 18 may be located interiorly of a wheel, as shown relative to wheel 12, along an axle. A drive means 20 may also be located exteriorly of a wheel, as shown relative to wheel 14. An additional location for the drive means, not shown in FIG. 1, could be completely within the dimensions of one or both of the wheels 12 and 14. The drive means could be mounted to drive any one or more of the UAV's wheels that are used for ground travel. Locating drive means so that they are capable of driving all of the UAV's wheels provides an all wheel drive function that significantly extends the ground travel capabilities of the UAV. A UAV with all wheel drive would not be limited to ground travel only on a relatively firm surface, but ground movement would be possible on any surface, including but not limited to, sandy, muddy, and boggy surfaces where a vehicle without all wheel drive is likely to become stuck.

Figure 2A:
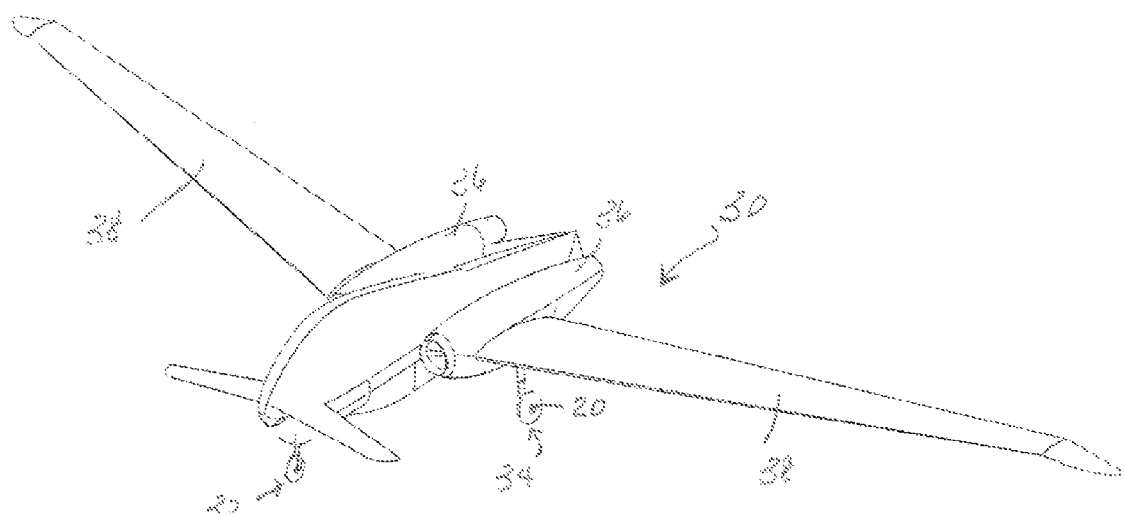
FIG. 2a illustrates one type of unmanned aerial vehicle equipped with an onboard drive means in accordance with the present invention.
Figure 2B:
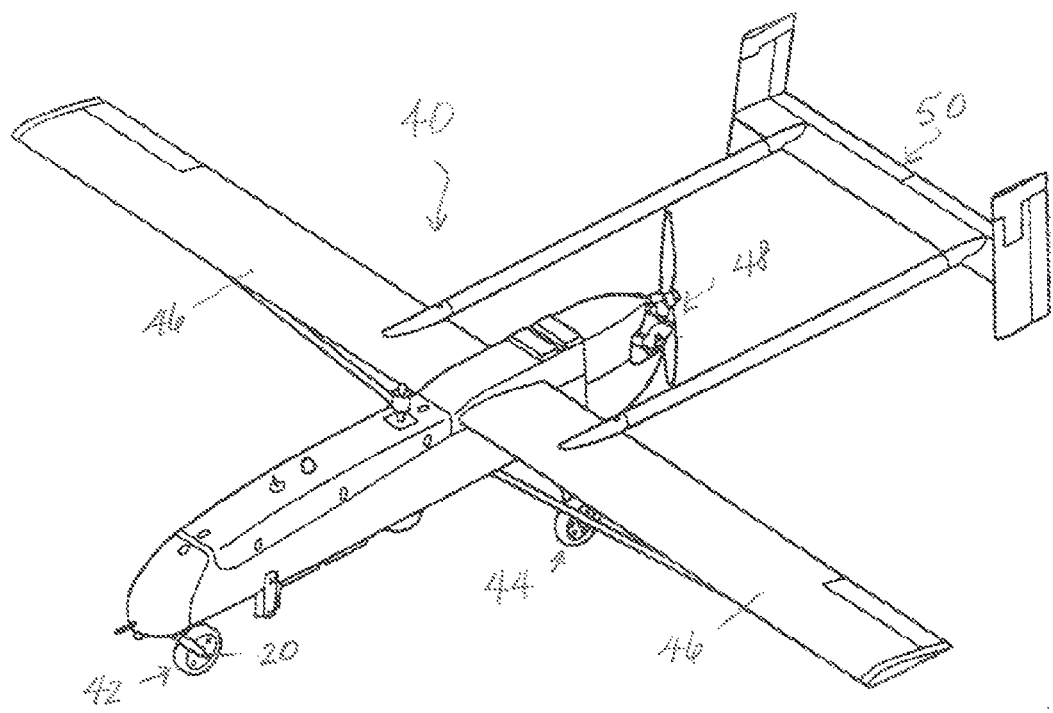
FIG. 2b illustrates a second type of unmanned aerial vehicle equipped with an onboard drive means in accordance with the present invention.
Figure 2C:
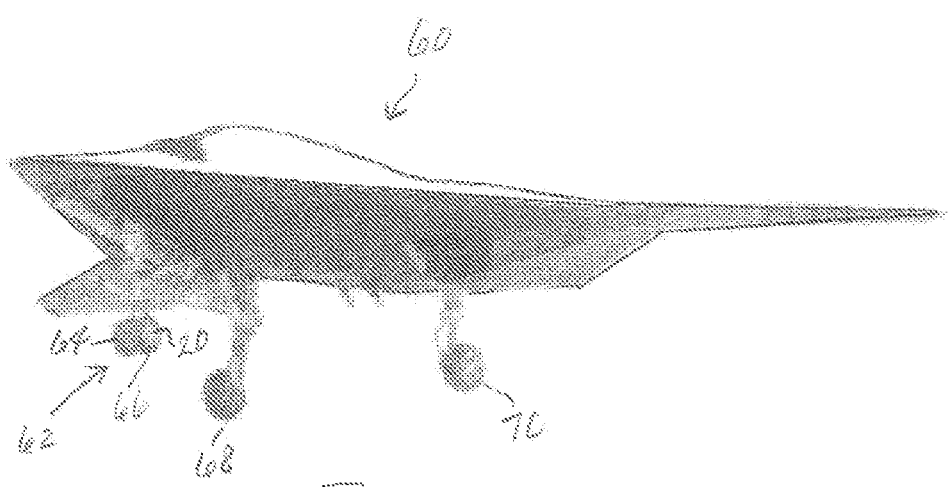
FIG. 2c illustrates a third type of unmanned aerial vehicle equipped with an onboard drive means in accordance with the present invention.

FIGS. 2a, 2b, and 2c illustrate only some of the many different designs and body configurations of unmanned aerial vehicles with wheels. These three types of UAVs all have tricyclic arrangements of wheels. The present method may be effectively used with other arrangements and numbers of wheels besides those shown in these drawings. The FIG. 1 double wheel configuration may be present on some UAVs, and other UAVs may have only a single wheel rotatably mounted on a strut attached to the UAV body. These variations do not limit the application of the present method to expand ground travel capability.

The UAV 30 shown in FIG. 2a is a fixed wing type of UAV with a body configuration that is similar to that of a conventional aircraft. The tricyclic wheel arrangement includes a single nose wheel 32 and a pair of main wheels 34, only one of which is shown in FIG. 2a. A pair of engines or turbines 36 mounted adjacent to the wings 38 provides the power to operate the UAV 30 in flight and on the ground where engine thrust can be used for that purpose. A drive means 20, as described in connection with FIG. 1, is shown mounted in driving connection with the main wheel 34. A drive means 18 or 20 (FIG. 1) could also be mounted to drive the other main wheel (not shown) or both main wheels or nose wheel 32. For all wheel drive capability, drive means would be mounted to drive the nose wheel 32 and both main wheels.

The UAV 40 shown in FIG. 2b also has a tricyclic wheel arrangement with single wheels in each position. A single nose wheel 42 and single main wheels, only main wheel 44 being visible, are provided to enable the UAV 40 to land, take off, and move on the ground between landing and take off. A drive means 20, or a drive means 18, as shown and described in connection with FIG. 1, is mounted to drive the nose wheel 42, but could also be mounted on one or more of the main wheels 44 or on all of the wheels as described above in connection with the UAV shown in FIG. 2a. UAV 40 is an example of a hybrid type of UAV and includes both fixed wings 46 and a rotor 48. The structure 50 that extends from the wings 48 beyond the rotor 50 provides navigational control when the UAV is in flight.

The UAV 60 shown in FIG. 2c is a fixed wing type of UAV with an integral body and fixed wing configuration. UAV 60 also has a tricyclic wheel arrangement with conventional aircraft landing gear and wheels that retract into the UAV body. The UAV 60 includes a nose landing gear 62 with a pair of wheels 64 and 66 and two single main wheels 68 and 70. The arrangement of wheels 64 and 66 in the nose gear 62 is similar to that shown in FIG. 1. As in the UAVs shown and described in FIGS. 2a and 2b, one or more drive means 20 as shown, and/or drive means 18 as shown and discussed in connection with FIG. 1, can be located to drive one or both nose gear wheels 64 and 66 or to drive one or both main wheels 68, 70 or to drive three of the wheels or all of four of the wheels. A drive means 20 is shown located on a nose wheel 66, but a drive means could be located in any or all of the aforementioned locations.

A preferred drive means capable of moving an unmanned aerial vehicle on the ground in accordance with the present invention is specifically designed to be retrofitted on existing UAVs without requiring changes to existing wheel structures. A major advantage of the design of this wheel drive means is achieved by the continued use of the existing tires, axle, and associated structures already in use on a UAV.

In a conventional aircraft, the drive means would most likely be controlled from a cockpit by a pilot and could be controlled remotely by ground personnel if necessary. A UAV, however, is unmanned and, therefore, not driven by a pilot. Control of a UAV is generally conducted from a remote location, but a UAV can also be controlled autonomously using specific control software or by a combination of these two methods. Control of the UAV drive means of the present invention could be easily integrated into both of these control systems. Smart software and data links could also be employed to increase ground movement control in a UAV equipped with drive means as described herein.

In accordance with the present method, a UAV equipped with at least one drive means as described above could be directed to fly to a desired location, land on the ground, turn off its engine or rotor, and move quietly over the ground surface to a desired destination. The possible destinations are not limited by the type of ground surface or the need to move without producing a significant acoustic signature. Such destinations could include, for example, a location with a good view of an area to be kept under surveillance, an undercover location, or near a traveled route. A UAV equipped with onboard drive means can place itself so that the sensors it carries can be used to the best advantage. To conserve power, it is contemplated that the power source powering the UAV drive means would have a hibernation or sleep mode control function that would remain in effect until a designated preset input was received by one or more sensors, at which time the UAV would be activated to move to another ground location, deploy munitions, take off, or perform whatever action is required. A UAV equipped as described could remain at a single site indefinitely or as long as sensor activity and communication with a remote control station can be maintained. It is anticipated that this time period would extend from at least several hours to at least several weeks. The addition of a solar panel to the UAV would enable the UAV to maintain sensor and communication activity and still be ready for drive means-controlled ground movement as needed. The use of POWER CHIPS™ would also make surveillance for a significant period of time possible.

Many UAVs are used solely for the purpose of launching ordnance or deploying munitions. A UAV equipped with drive means according to the present method is able to be controlled to move quietly and efficiently to an optimum location for this purpose. The UAV can be instructed to move to launch its payload from a location where this can be done much more accurately than was possible in the past. Since the UAV's ground movement can be done quietly, this movement is not likely to be detected as easily. A UAV could also itself be a weapon, and the method of the present invention allows the UAV to function like a guided intelligent mine that can be controlled to move quietly to an optimum location where it can be most effectively destroyed. In another scenario, the UAV could move to a location along a road where it would camp out until a specifically identified target approaches, when the UAV would attack the target. Any weaponry techniques presently known could be employed for this purpose. After the attack, the UAV could be directed to move to another location for another attack, to perform some other task, or to fly back to its base. A UAV equipped with an onboard drive means according to the present invention can be controlled to move where it is needed to achieve the best results in carrying out a mission.

A further example of the use of a UAV equipped with onboard drive means could involve a situation in which a military force is interested in a specific location, for example a certain village or a certain military encampment. UAVs can be flown there and moved on the ground to unobtrusive locations where the comings and goings of the village inhabitants, military personnel, or others can be sensed and/or observed and communicated to a remote control location. The UAVs can be provided with the capability to self destruct if they are detected or, if captured, to self destruct at an optimal time. Alternatively, the onboard drive means can be controlled to move the UAV on the ground away from area to a safer launch location where the UAV can take off and leave the area by air.

In the event of an assault occurring in the area where the UAV is located, the UAV's ground movement capability enables it to provide troops with intelligence at a single location or any number of locations. An additional advantage is presented by a drive means-equipped UAV's ability to move on the ground to a location where it can lase a target for launching airborne or land borne missiles. Currently, troops have to be on the ground to perform this dangerous task, which can now be performed by a UAV capable of controlled independent ground movement. The foregoing examples are intended to be illustrative only. Many other military and civilian tasks can be performed by a UAV equipped with onboard drive means that enables the UAV to move efficiently on a variety of ground surfaces while generating only a minimal acoustic profile or signature in accordance with the present method.

In addition to enhancing stealth and expanding ground movement capabilities in unmanned aerial vehicles equipped with controllable onboard drive means, the present method can be used to enhance stealth in the independent ground movement of piloted aircraft. Aircraft of any type equipped with onboard drive means controllable to drive one or more aircraft nose wheels or main wheels and move the aircraft on the ground independently without relying on the aircraft's main engines or rotors are now able to move very quietly during ground travel without producing an audible footprint. This capability is particularly valuable in military applications, such as special operations and the like. Troop insertions and extractions can be accomplished quietly and efficiently, both at night and during the day. Noise is minimized by the very quiet ground travel possible, which is especially important at night. During the day, ground movement is accomplished without use of the aircraft's engines, which not only produce noise, but also produce dust clouds. Ground movement of an aircraft using controllable onboard drive means as described herein minimizes the production of visible dust clouds and other windborne matter. An aircraft can also be moved quietly under relative cover to a location away from a landing or take off zone that might be safer.

While the present method has been described with respect to the operations of a single unmanned aerial vehicle, this method also can be effectively used with other numbers of UAVs. For example, a plurality of unmanned aerial vehicles may be provided with powered onboard drive means. The plurality of unmanned aerial vehicles may be flown to a selected location of interest and landed at this location. The controllable onboard drive means powered by each UAV's non-motive power source are operated to move the plurality of UAVs over the ground surface without producing a visible or audible footprint to designated positions in a targeted location. The designated locations are optimally chosen so that the plurality of UAVs may obtain and communicate a maximum amount of information about the targeted location.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability when it is desired to expand ground movement capability and enhance stealth in unmanned aerial vehicles, primarily in military applications, but also in such civilian applications as search and rescue operations and the like.

The invention claimed is:

1. A method for operating an unmanned aerial vehicle to enhance stealth and improve and expand ground movement capability in performing military and civilian operations, comprising:
   a. equipping all wheels of an unmanned aerial vehicle with onboard electric drive means comprising electric drive motors mounted within each of the wheels of the unmanned aerial vehicle to drive each of the wheels and move the unmanned aerial vehicle on wet or dry sandy, muddy, and boggy ground surfaces, a main source of motive power to operate the unmanned aerial vehicle, and a source of electric drive means power separate from the main source of motive power with a reduced acoustic signature and a reduced audible footprint compared to the acoustic signature and the audible footprint of the main source of motive power to operate the drive means to move all of the wheels and drive the unmanned aerial vehicle on the wet or dry sandy, muddy, and boggy ground surfaces;
   b. defining a ground operation or task to be performed by the unmanned aerial vehicle in one or more selected ground environment locations with one or more of the wet or dry sandy, muddy, and boggy ground surfaces;
   c. autonomously or remotely controlling the unmanned aerial vehicle to take off from a takeoff location separate from the selected ground environment locations, flying the unmanned aerial vehicle with the main source of motive power to a selected ground environment location, and landing the unmanned aerial vehicle at the selected ground environment location;
   d. further autonomously or remotely controlling the unmanned aerial vehicle after landing at the selected ground environment location to shut off the main source of motive power, powering the electric drive means to drive each of the wheels, driving the unmanned aerial vehicle on the one or more ground surfaces with the source of electric drive means power, and performing the defined operation or task at the reduced acoustic signature and reduced audible footprint; and e. when the defined operation or task has been performed, autonomously or remotely controlling the unmanned aerial vehicle to self destruct.

2. The method described in claim 1, wherein the source of electric drive means power comprises an auxiliary power unit, batteries, fuel cells, solar power, or thermionic/thermotunneling power sources on the unmanned aerial vehicle.

3. The method described in claim 1, further comprising providing the unmanned aerial vehicle with self destruction means controllable integrally by a preset destruct setting in the autonomous control system or remotely by an operator to self destruct the unmanned aerial vehicle when the unmanned aerial vehicle has been moved on the ground to a position in a targeted location where it is necessary to self destruct the unmanned aerial vehicle or the defined ground operation or task requires destruction of the unmanned aerial vehicle.

4. The method described in claim 1, further comprising programming an autonomous control system to move the unmanned aerial vehicle with the reduced acoustic signature and reduced acoustic footprint to a targeted location on one of the ground surfaces to perform the defined operation or task; and automatically controlling the autonomous control system and moving the unmanned aerial vehicle to the targeted location and performing the defined operation or task.

5. The method described in claim 1, further comprising providing an array of sensors on the unmanned aerial vehicle for performing the defined ground operation or task, driving the unmanned aerial vehicle with the electric drive means to a desired ground environment location, controlling the array of sensors as required by the defined ground operation or task to enter a hibernation mode until a preset input is measured, parking the unmanned aerial vehicle in the desired ground environment location during a time period while the sensors are in the hibernation mode, awaking the sensors from hibernation mode when the preset input is measured, and driving the unmanned aerial vehicle with the electric drive means to another desired ground environment location or shutting off the electric drive means source of power and using the main source of motive power to take off as required by the defined ground operation or task.

6. The method of claim 1, wherein the electric drive motors are selected from the group comprising high phase order electric motors, toroidally wound electric motors, axial flux electric motors, permanent magnet brushless electric motors, synchronous electric motors, asynchronous electric motors, pancake electric motors, switched reluctance electric motors, electric induction motors, and inside-out electric motors.

7. A method for extending effective ground travel range and ground operations that can be conducted by a plurality of unmanned aerial vehicles capable of flight and ground movement on different ground surfaces, comprising:

a. providing a plurality of unmanned aerial vehicles powered in flight by a primary source of motive power and equipped with multiple wheels for ground travel and controllable electric drive motors mounted within the wheels and powered by a secondary source of motive power set to produce a reduced acoustic profile and a reduced auditory footprint compared to an acoustic profile and auditory footprint produced by the primary source of motive power;

b. flying the plurality of unmanned aerial vehicles with the primary source of motive power to a selected ground operation and location moving the plurality of unmanned aerial vehicles on a ground surface by driving the multiple wheels to conduct a predetermined ground operation, wherein the ground surface of the selected ground operation location comprises a wet or dry sand, muddy, or boggy ground surface;

c. when the plurality of unmanned aerial vehicles have landed at the selected ground operation location, deactivating the primary source of motive power, activating the secondary source of motive power to power the controllable electric drive motors, and controlling operation of the controllable electric drive motors to drive the multiple wheels and move the plurality of unmanned aerial vehicles on the ground surface with the reduced acoustic profile and the reduced auditory footprint and conducting the predetermined ground operation;

d. when the predetermined ground operation has been completed by the plurality of the unmanned aerial vehicles at the selected ground operation location, deactivating the secondary source of motive power and activating the primary source of motive power to fly the plurality of unmanned aerial vehicles away from the selected ground operation location, or causing the plurality of unmanned aerial vehicles to self destruct.

8. The method described in claim 7, wherein the plurality of unmanned aerial vehicles are selected from the group comprising at least fixed wing unmanned aerial vehicles and hybrid unmanned aerial vehicles.

9. The method described in claim 7, further comprising automatically or manually controlling the plurality of unmanned aerial vehicles from a location remote from the selected ground operations location to move said plurality of unmanned aerial vehicles on the ground surfaces and conducting the predetermined ground operation with the plurality of unmanned aerial vehicles.

10. The method described in claim 7, further comprising:
providing the plurality of unmanned aerial vehicles with an array of sensors to obtain information about the ground surfaces or to perform a task in the selected ground operation location;
landing the plurality of unmanned aerial vehicles on one of the ground surfaces in the selected ground operation location;
powering the controllable electric drive motors in all of the multiple wheels to drive all of the multiple wheels to move the plurality of unmanned aerial vehicles over the ground surface to designated positions;
parking the plurality of unmanned aerial vehicle in said designated positions and activating the array of sensors to obtain desired information or to perform a desired task; and
controlling the main source of motive power to cause the plurality of unmanned aerial vehicles to take off and fly away from the selected ground operation location when the information has been obtained or the task has been performed and completion communicated.

11. The method of claim 7, further comprising providing an internal combustion engine as the primary source of motive power and a source of electric or solar power as the secondary source of motive power.

* * * * *